US007499869B2

(12) United States Patent
Iknoian

(10) Patent No.: US 7,499,869 B2
(45) Date of Patent: Mar. 3, 2009

(54) SYSTEM AND METHOD FOR SCHEDULING EMPLOYEE SHIFTS

(76) Inventor: Matthew Iknoian, 6337 N. Palm, Fresno, CA (US) 93650

( * ) Notice: Subject to any disclaimer, the term of this patent is extended or adjusted under 35 U.S.C. 154(b) by 0 days.

(21) Appl. No.: 11/346,746

(22) Filed: Feb. 2, 2006

(65) Prior Publication Data

US 2007/0179830 A1 Aug. 2, 2007

(51) Int. Cl.
*G06Q 10/00* (2006.01)
(52) U.S. Cl. ...................................................... 705/9
(58) Field of Classification Search ............... 705/9
See application file for complete search history.

(56) References Cited

U.S. PATENT DOCUMENTS

| | | | | |
|---|---|---|---|---|
| 5,111,391 A * | 5/1992 | Fields et al. | .................... | 705/9 |
| 5,289,368 A * | 2/1994 | Jordan et al. | .................... | 705/8 |
| 5,408,663 A | 4/1995 | Miller et al. | | |
| 6,049,776 A | 4/2000 | Donnelly et al. | | |
| 6,192,346 B1 * | 2/2001 | Green | ............................ | 705/9 |
| 6,278,978 B1 * | 8/2001 | Andre et al. | .................... | 705/9 |
| 6,334,133 B1 | 12/2001 | Thompson et al. | | |
| 6,587,831 B1 * | 7/2003 | O'Brien | ......................... | 705/8 |
| 6,792,087 B2 | 9/2004 | Abdoh | | |
| 6,957,188 B1 * | 10/2005 | Dellevi et al. | .................. | 705/9 |
| 7,155,519 B2 * | 12/2006 | Lo et al. | ..................... | 709/227 |
| 7,249,047 B2 * | 7/2007 | Arguello et al. | ................ | 705/9 |
| 2003/0050830 A1 * | 3/2003 | Troyer | .......................... | 705/11 |
| 2003/0061089 A1 * | 3/2003 | Weaver | .......................... | 705/9 |
| 2003/0212583 A1 * | 11/2003 | Perras et al. | .................... | 705/7 |
| 2004/0039619 A1 * | 2/2004 | Zarb | ............................ | 705/7 |
| 2004/0078257 A1 * | 4/2004 | Schweitzer et al. | ............ | 705/9 |
| 2004/0215475 A1 * | 10/2004 | Maglaris et al. | ................ | 705/1 |
| 2004/0249819 A1 * | 12/2004 | Matsumoto et al. | ........... | 707/10 |
| 2004/0267595 A1 * | 12/2004 | Woodings et al. | .............. | 705/9 |

(Continued)

FOREIGN PATENT DOCUMENTS

JP  2005056062  *  3/2005

OTHER PUBLICATIONS

"Display a Personal Work Schedule in an Electronic Calendar", IBM Technical Disclosure, Mar. 1992, retrieved from: East.*

(Continued)

*Primary Examiner*—Jonathan G Sterrett
(74) *Attorney, Agent, or Firm*—Dalina Law Group, P.C.

(57) ABSTRACT

A system and method for scheduling employee shifts. Two types of users generally utilize the system to post and view schedules, managers and workers. A manager may define shifts for work areas and post the shifts so workers may obtain their schedule and know when to work. Workers may retrieve the schedule from any network enabled device located anywhere. Worker unavailability times and requests for schedule changes may be made remotely by the worker at any network enabled computing device. Managers may accept or reject requests and utilize employee unavailability times to schedule workers to a shift and readily observe conflicts and schedule around these conflicts using a schedule screen that shows the workers, their unavailability times and scheduled times. Time and wage summaries may be updated directly on the screen when changes to the shifts are made to allow a manager to minimize wages for a shift or work area.

8 Claims, 4 Drawing Sheets

U.S. PATENT DOCUMENTS

2005/0114195 A1* 5/2005 Bernasconi ................ 705/9
2005/0137925 A1* 6/2005 Lakritz et al. ............... 705/8
2005/0209901 A1* 9/2005 Miller et al. ................ 705/8
2006/0020509 A1* 1/2006 Strain et al. ................ 705/14

OTHER PUBLICATIONS

Tyson, Herb, "Sams Teach Yourself Microsoft Outlook 2000 in 24 Hours", Sams Publishing, 1999, pp. 478-484.*

* cited by examiner

FIG. 2

SYSTEM AND METHOD FOR SCHEDULING EMPLOYEE SHIFTS

BACKGROUND OF THE INVENTION

1. Field of the Invention

Embodiments of the invention described herein pertain to the field of employee scheduling. More particularly, but not by way of limitation, one or more embodiments of the invention enable systems and methods of employee shift scheduling using a graphical web based interface or wireless device interface.

2. Description of the Related Art

There are many types of schedules that are used in a wide area of endeavor. Schedules generally plot a task, resource or human against time in order to schedule a solution to a problem. Gantt charts, PERT charts, resource plots and other types of schedules vary in the element that is plotted against time. Gantt charts plot a list of tasks that may or may not depend on one another against time. PERT charts are intended to calculate the minimum time required to complete a complex project having distinct tasks. Another type of chart that is used is an employee shift schedule.

There are a number of requirements and/or preferences associated with employee shift scheduling. Traditionally, employee scheduling has been done by a manager writing employee names and times to work on a paper that is posted in a work area. The schedule allows employees to know when they are required to work. In addition, managers have used spreadsheets to post schedules by printing out a schedule and posting it in a work area. The amount of time that this process takes is large when events occur that require changes to the schedule. When a manager receives a request for time off for an employee of a given shift, the manager generally makes multiple phone calls to other employees in an attempt to fill the empty shift. With a paper based solution, all employee unavailability times are haphazardly written in a list and when the manager creates the schedule conflicts that could be avoided are generally missed and result in extra work for the manager. The resulting schedule therefore immediately requires editing.

Current computer based solutions display shifts on a schedule but leave the schedule screen when performing tasks. Leaving the schedule screen makes it difficult to observe schedule conflicts when requesting shifts for example. In existing applications, there is no way for a manager to determine a conflict before the manager assigns a shift that conflicts with a user-unavailability. To find the conflict a manager must traverse multiple screens which is inefficient and frustrating to the manager. Current web based solutions do not automatically calculate wages, hours and employees in real-time when a shift change is made on a schedule and therefore do not allow a manager to quickly minimize wages for a shift. In addition, there are no known solutions that provide a single screen that is updated with conflicts that a manager can readily de-conflict or avoid conflicts by observing a potential conflict and unavailability while on one screen. In addition, when a schedule has been updated, users with limited functionality cell phones for example may be sent a text message saying that a schedule is ready without actually sending a compressed or shorthand version of the schedule.

U.S. Pat. No. 6,049,776 to Donnelly, et al., describes a system that identifies candidate workers to be assigned to a project based on their predetermined skills and predetermined time availability. The system is directed towards scheduling workers based on their individual skills to unique projects. Workers are inherently unequal and therefore there is no contemplation of shift scheduling where one worker may readily substitute for another. FIGS. 28 and 29 show that schedule conflicts are shown with windows unrelated to the schedule window. In addition, there is no contemplation of showing or utilizing one schedule to perform and display shift related tasks.

U.S. Pat. No. 5,408,663 to Miller describes a method for optimizing project scheduling. The existing schedule is optimized by iterating through the schedule and modifying each task according to policies that minimize task duration. The methods also include selection of an optimum mix of workers to be hired to complete a scheduled project. Workers are inherently unequal and therefore there is no contemplation of shift scheduling where one worker may readily substitute for another. In addition, there is no single schedule screen where conflicts between shifts and reserved times for an employee may be dealt with for example.

U.S. Pat. No. 6,957,188 to Dellevi et al., describes a system for trading shifts between employees. The method includes checking a database to ensure that the individuals trading shifts have the same training. In addition, there is no contemplation of showing or utilizing one schedule to perform and display shift related tasks.

U.S. Pat. No. 6,192,346 to Green describes a system and method for bidding on vacation and holiday shifts. The methods include giving priority to employees based on seniority with respect to vacation and holiday shifts worked or not. In addition, there is no contemplation of showing or utilizing one schedule to perform and display shift related tasks, e.g., FIG. 7 shows days but not the shifts on each day and does not allow for shift related tasks to be performed as such on the calendar of FIG. 7.

U.S. Pat. No. 6,334,133 to Thompson et al., describes a system for substituting workers for other workers that are unavailable due to a temporary absence. When a worker absence is to occur, the system searches a database to obtain a list of potential replacements for worker that will be absent. The system then contacts potential replacement workers for example substitute teachers. There is no method for showing conflicts and providing shift related tasks to be performed on the schedule.

U.S. Pat. No. 6,792,087 to Abdoh describes a system for scheduling health care workers that uses a telephone interface and an email interface to communicate a plurality of schedules to workers. There is no single schedule interface showing shifts on each day and providing shift relating tasks to be performed on the schedule.

United States Patent Application Publication No. 20040215475 describes a system for shift scheduling and cost determination. The system is mainly concerned with minimizing costs through appropriate allocation of personnel per shift. The system does not contemplate use of a single schedule showing all workers times per each day. See FIG. 3.

For at least the limitations described above there is a need for a system and method for scheduling employee shifts that allows for conflicts to be readily determined and shift related tasks to be performed on the schedule.

BRIEF SUMMARY OF THE INVENTION

One or more embodiments of the invention enable a system and method for scheduling employee shifts. Two types of users generally utilize the system to post and view schedules, managers and workers. A manager may define shifts for a job or work area and post the shifts so that workers may obtain their schedule and know when they are scheduled to work. Embodiments of the invention may utilize a web based interface so that managers may create and post a schedule and workers may retrieve the schedule from any network enabled device at any location. Worker unavailability times and requests for schedule changes may be made remotely by the worker at any network enabled computing device. Managers may accept or reject requests and utilize employee unavailability times to schedule particular workers to a shift and readily observe conflicts and schedule around these conflicts using a schedule screen that shows the workers, their unavailability times and scheduled times. Unavailability may include any period of time for which an employee cannot work which may include entire days that the employee has requested and been granted off. In addition, embodiments of the invention may present time and wage summaries that may be updated directly on the screen, optionally without a round trip to the server, to allow a manager to quickly minimize wages for a shift or work area.

Generally, a manager or worker logs into the system from any network connected computing device. This allows for only the manager and workers associated with a shift to see the schedule. Any type of computing device may be utilized so long as the device is network enabled. For example, a PC, a cell phone, a PDA or any other network enabled device at any location may be utilized to log into the system and obtain a schedule. If the user has forgotten their password, the system can email them their password after they input their username. The schedule may be displayed on a rich user interface on a PC or other web enabled display device or in a shorthand version on cell phones with limited display functionality for example.

Once a user such as a manager or worker has logged into the system, the user can obtain a schedule. In the case of a manager, the manager may be presented all of the schedules for all of the jobs or work areas that the manager is associated with. Embodiments of the invention allow for a manager to perform schedule specific tasks directly on the schedule. For example, the manager may define jobs, shifts, add or remove workers from a job, post a schedule, copy a schedule, find a replacement, contact (via email or instant message) an employee and manage requests such as time-off requests, observe worker unavailability, assign shifts to workers, observe and handle conflicts and any other schedule related function directly on the schedule screen. In the case of a worker, the worker can obtain the schedule and determine what shifts have been assigned to the worker and request time off and set unavailability times that the manager may observe directly on the schedule. Embodiments of the invention allow for the worker to also contact other workers to find a candidate replacement worker. This further reduces the amount of labor required from the manager since the schedule may show two requests, one for time off, the other requesting the shift that the first worker has requested time off for, thereby allowing the manager to simply "accept" the switch without making a single phone call or leaving the schedule screen.

Embodiments of the invention allow for a manager to define a job. The job may comprise a number of stations at a work area for example. Once a job is defined, then workers may be assigned to the job or added to all jobs as potential workers for shifts associated with the job. Any workers that are employed after the job is defined may be added as potential workers for the job by entering metadata associated with the worker into the system. For example, the worker's name and contact information may be entered. The manager may observe a schedule that is displayed for a given job and decide which workers that the manager wants to work a given shift. Shifts are defined by selecting a number of cells, which are user specific and time specific locations on the schedule, and then entering one or more starting and ending times. The shifts may be saved by the manager and then posted so that workers may observe the times that they are scheduled to work. The schedule may be printed and placed in a common work area as well.

After a schedule has been created and shifts associated with workers, the schedule may be copied to another day or week or other time period for example. This eliminates redundant work since the manager may simply decide to keep schedules that are acceptable to the manager and workers associated with the job. By posting the schedule, the schedule is available for worker viewing either from a browser, or via a cell phone text message or any other type of communication that is utilized by workers.

When a workers calls in sick or requests time off, a replacement may be found quickly using the schedule. Embodiments of the invention allow for a manager to assert a find replacement function that shows all of the worker cells that are not currently working a given shift. This may involve coloring the empty cells in the schedule for a given shift in a color that makes the unallocated cells more visible for example. This allows for workers that have not already been assigned to work the shift and that have not requested the day off, and who are allowed to work the job to be viewed. After the available workers have been displayed, the manager may contact them to find out if they are available or decide to assign a given worker to the shift. If the workers have entered email information as part of their metadata, then the system may automatically email them to determine if they are willing to accept the shift. Any workers that are currently using an instant messaging application or have a cell phone text messaging service may also be quickly contacted. Phoning the worker is also possible by displaying the phone metadata associated with a worker. Regardless of the method of contacting the employee the manager may then assign a worker to the shift.

Upon entry to the system, workers may set their days off and block out times per day that they are unavailable. This allows for the manager to avoid conflicts before scheduling workers by displaying the unavailability directly on the schedule as a graphic glyph that allows the manager to visually determine when a worker is available or not. One or more embodiments of the invention show the unavailability in each cell on the schedule for which unavailability has been defined by each worker. In one or more embodiments the employees availability and/or unavailability is shown specific to a day within a cell that is associated with a day.

In addition to viewing the requests on the schedule, a manager may also view the requests that have been sent by the workers in a list view for example. The manager may then traverse the requests and accept or deny them. Requests may be color coded in the list view to show how far into the future the requests are at. The schedule may also display the hours and wages defined by the assigned shifts for the selected workers and may also show percentages of the scheduled labor divided by the sales for example. Requests may have associated cost values associated with them so that a manager may for example determine what the cost of a particular request may be. For example, a request for a day off from an employee with a low wage rate may show the minimum and maximum cost of replacing that worker based on the minimum and maximum pay rate of the other workers that are not scheduled, but who could work that day. One or more embodiments of the invention may show labor costs when a manager selects a particular worker to cover a shift after accepting a worker's request for time off. In other embodiments the labor costs may be shown either independent of a request for time off by another worker or in conjunction with the request.

The schedule may be printed into a variety of page sizes for hardcopy display of the schedule. In addition, all data associated with the schedule may be printed or exported to a spreadsheet for additional calculations or display generation in keeping with the spirit of the invention.

BRIEF DESCRIPTION OF THE DRAWINGS

The above and other aspects, features and advantages of the invention will be more apparent from the following more particular description thereof, presented in conjunction with the following drawings wherein:

FIG. 2 shows an embodiment of a request screen that allows a worker to declare unavailable time, request time off and submit comments to a manager.

DETAILED DESCRIPTION

A system and method for scheduling employee shifts will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
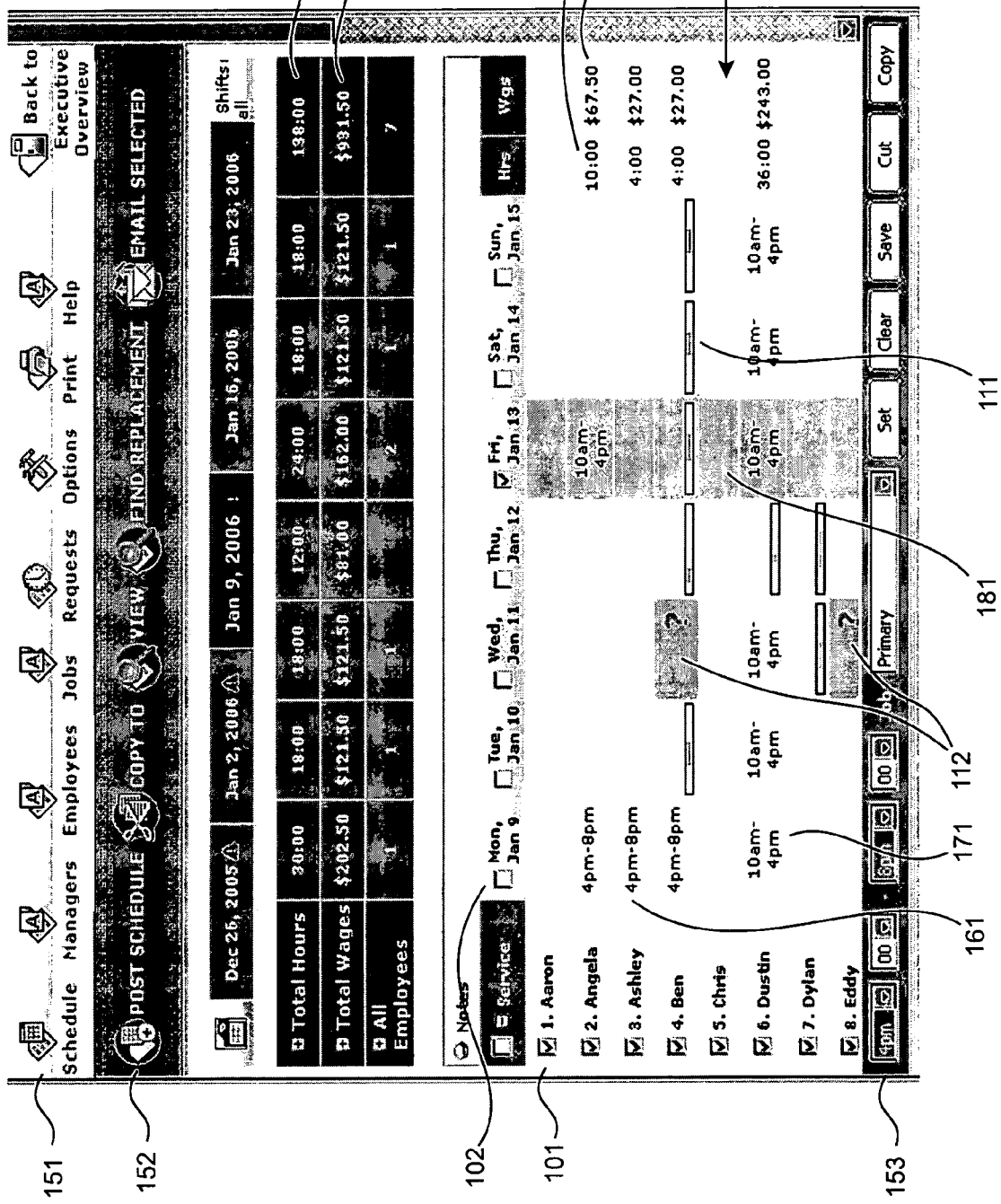
FIG. 1 shows an embodiment of a schedule.

One or more embodiments of the invention enable a system and method for scheduling employee shifts. Two types of users generally utilize the system to post and view schedules, managers and workers. A manager may define shifts for a job or work area and post the shifts so that workers may obtain their schedule and know when they are scheduled to work. Embodiments of the invention may utilize a web based interface so that managers may create and post a schedule and workers may retrieve the schedule from any network enabled device at any location. FIG. 1 shows an embodiment of the invention comprising schedule 100. This figure also shows commands available only to a manager. The schedule comprises workers 101 displayed in the vertical axis of the schedule and time intervals 102 displayed along the horizontal axis of the schedule. Worker unavailability times 111 and requests for schedule changes 112 are shown on the schedule itself and may be made remotely by the worker at any network enabled computing device. Managers may accept or reject requests 112 and utilize employee unavailability times 111 to schedule particular workers to a shift and readily observe conflicts and schedule around these conflicts using schedule 100 that shows the workers, their unavailability times and scheduled times. In addition, embodiments of the invention may present time summary information 121 and wage summary information 122 for the defined shifts on a per day basis for each time interval 102 and/or per user time summary information 121a and per user wage summary information 122b. Time and wage summary information 121 and 122, and/or 121a or 122b, may be updated directly on the screen, optionally without a round trip to the server, to allow a manager to quickly minimize wages for a shift or work area.

Generally, a manager or worker logs into the system from any network connected computing device. Any popup or interactive interface that allows for a username and password to be accepted by the system is in keeping with the spirit of the invention. Upon successful username and password entry, a manager and workers associated with a shift are allowed to see the schedule. Any type of computing device may be utilized so long as the device is network enabled. For example, a PC, a cell phone, a PDA or any other network enabled device at any location may be utilized to log into the system and obtain a schedule. If the user has forgotten their password, the system can email them their password after they input their username. Alternatively, the user can input their email address and have their password sent to their email address.

Once a user such as a manager or worker has logged into the system, the user can obtain schedule 100. A worker does not in general have access to shift definition, or modification functions that a manager has access to. Therefore, generally the worker is only shown schedule 100. In the case of a manager, the manager may be presented all of the schedules for all of the jobs or work areas that the manager is associated with. Embodiments of the invention allow for a manager to perform schedule specific tasks directly on the schedule. For example, the manager may define jobs, shifts, add or remove workers from a job, post a schedule or un-post a schedule, copy a schedule, find a replacement, contact (via email or instant message) an employee and manage requests such as time-off requests, observe worker unavailability, assign shifts to workers, observe and handle conflicts and any other schedule related function directly on the schedule screen and/or with buttons or other interface elements associated with the schedule. For example, menu 151 and menu 152 comprise these functions in one embodiment of the invention, while entry area 153 allows for shift time periods to be set in one embodiment of the invention.

Figure 2:
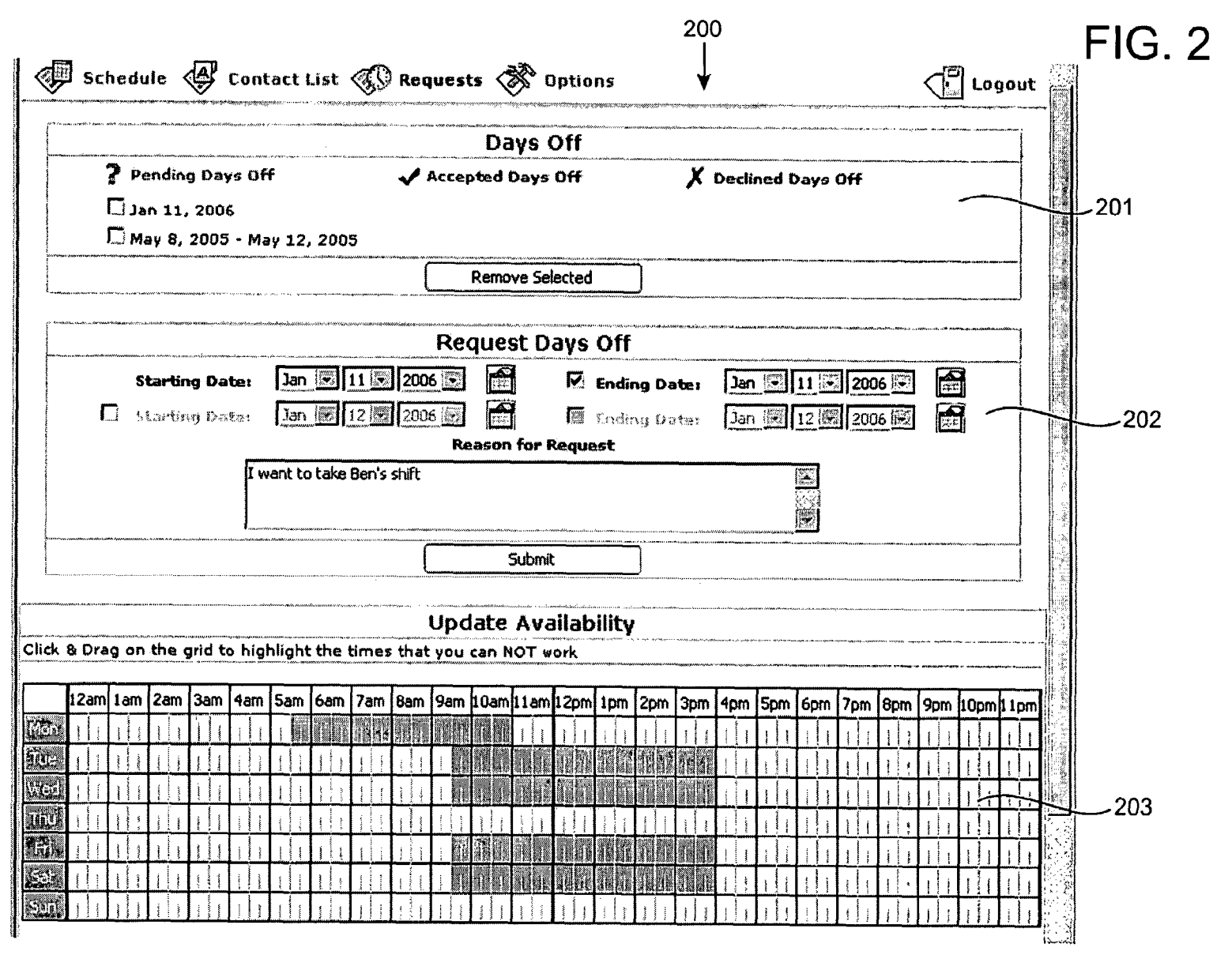

In the case of a worker, the worker can obtain the schedule and determine what shifts have been assigned to the worker and request time off and set unavailability times that the manager may observe directly on the schedule. FIG. 2 shows an embodiment of request screen 200 that allows a worker to declare unavailable time, request time off and submit comments to a manager. Days off area 201 is used to declare days that the employee cannot work. Request area 202 allows a worker to request days or hours off. Availability grid 203 allows a fine grained graphical view to be used for setting and requesting availability. Embodiments of the invention allow for the worker to also contact other workers to find a candidate replacement worker. This further reduces the amount of labor required from the manager since the schedule may show two requests, one for time off, the other requesting the shift that the first worker has requested time off for, thereby allowing the manager to simply "accept" the switch without making a single phone call or leaving the schedule screen.

Figure 4:
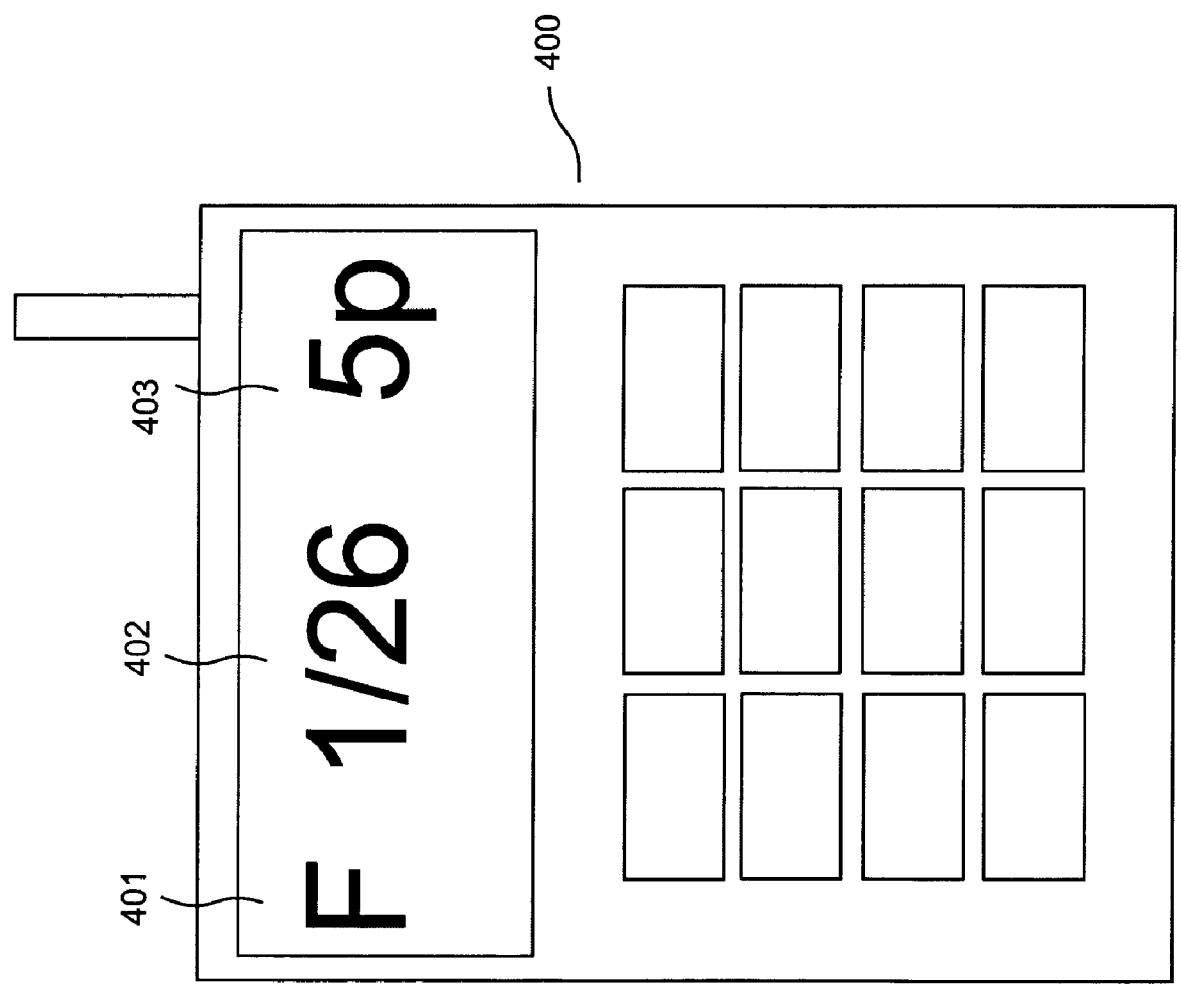
FIG. 4 shows a short hand text message for displaying a shift on a display device with limited graphics capabilities, for example a cell phone with a small screen that is incapable of rich graphics display.

FIG. 4 shows a short hand text message for displaying a shift on a display device with limited graphics capabilities, for example a cell phone 400 with a small screen that is incapable of rich graphics display. In this example interface for low resolution cell phone or wireless devices, a shorthand version showing day 401, date 402, time 403 allows a user with a limited capability device to obtain a shift immediately.

In this example, day 401 is shorthand for "Friday", date 402 is shorthand for "January 26th" and time 403 is shorthand for "5:00 PM". Alternatively, the station that a worker is to report to may be appended to the shorthand message. In one or more embodiments of the invention, the word "NEW" or letter "N" for example may be prepended to the shift to indicate that the shift is a new shift that has just been assigned. The word "DEL" or letter "D" or any other letter or word that is known to mean that a shift has been canceled or deleted may be prepended. The words or letters associated with a shift may also be appended or the shorthand message may be shown in a different color for example to indicate that the shift is new "green" or canceled "red" for example. In one or more embodiments of the invention an full weeks worth of shifts may be sent to the cell phone or other electronic device in a list format that is optionally scrollable.

Embodiments of the invention allow for a manager to define a job. The job may comprise a number of stations at a work area for example. Once a job is defined, then workers may be assigned to the job or added to all jobs as potential workers for shifts associated with the job. The hours that are assigned are shown in FIG. 1 for a given shift as shift hour display 161. A popup or any other method of defining the job may be utilized in keeping with the spirit of the invention. Any workers that are employed after the job is defined may be added as potential workers for the job by entering metadata associated with the worker into the system. For example, the worker's name and contact information may be entered. The manager may observe a schedule that is displayed for a given job and decide which workers that the manager wants to work a given shift. Shifts are defined by selecting a number of cells, which are user specific and time specific locations on the schedule, and then entering one or more starting and ending times. Shifts that are not yet posted 171 may be shown in a different font color or background color for the cell in one or more embodiments of the invention. The shifts may be saved by the manager and then posted so that workers may observe the times that they are scheduled to work. The schedule may be printed and placed in a common work area as well.

After a schedule has been created and shifts associated with workers, the schedule may be copied to another day or week or other time period for example. This may be accomplished for example using a menu or button on menu bar 152 as shown in FIG. 1. This eliminates redundant work since the manager may simply decide to keep schedules that are acceptable to the manager and workers associated with the job. By posting the schedule, the schedule is available for worker viewing either from a browser, or via a cell phone text message or any other type of communication that is utilized by workers.

When a worker calls in sick or requests time off, a replacement may be found quickly using the schedule. Embodiments of the invention allow for a manager to assert a find replacement function that shows all of the worker cells that are not currently working a given shift. This may involve coloring the empty cells in the schedule for a given shift in a color that makes the unallocated cells more visible for example. Available shifts 181 are shown in the column of time for which the replacement is to be made. Asserting the "Find Replacement" command found in menu bar 152 for example highlights all of the workers that are available for a desired shift (for example as may be shown in entry area 153, e.g., in this case any worker that is available from 4 PM to 8 PM). This allows for workers that have not already been assigned to work the shift and that have not requested the day off, and who are allowed to work the job to be viewed. After the available workers have been displayed, the manager may contact them to find out if they are available or decide to assign a given worker to the shift. If the workers have entered email information as part of their metadata, then the system may automatically email them to determine if they are willing to accept the shift. Any workers that are currently using an instant messaging application or have a cell phone text messaging service may also be quickly contacted. Phoning the worker is also possible by displaying the phone metadata associated with a worker. Regardless of the method of contacting the employee the manager may then assign a worker to the shift.

Upon entry to the system, workers may set their days off and block out times per day that they are unavailable. This allows for the manager to avoid conflicts before scheduling workers by displaying the unavailability directly on the schedule as a graphic glyph that allows the manager to visually determine when a worker is available or not. One or more embodiments of the invention show the unavailability in each cell on the schedule for which unavailability has been defined by each worker. This is shown in FIG. 1 as unavailability times 111. For example a dark band in the unavailability time represents time that the worker cannot work while the light area portion of the horizontal bar represents the time that the worker can work. A fully colored bar indicates that the worker is unavailable for the entire day.

In addition to viewing requests 112 on the schedule, a manager may also view the requests that have been sent by the workers in a list view for example. The manager may then traverse the requests and accept or deny them. Requests may be color coded in the list view to show how far into the future the requests are at. The schedule may also display the hours and wages defined by the assigned shifts for the selected workers and may also show percentages of the scheduled labor divided by the sales for example.

The schedule may be printed into a variety of page sizes for hardcopy display of the schedule. In addition, all data associated with the schedule may be printed or exported to a spreadsheet for additional calculations or display generation in keeping with the spirit of the invention.

Figure 3:
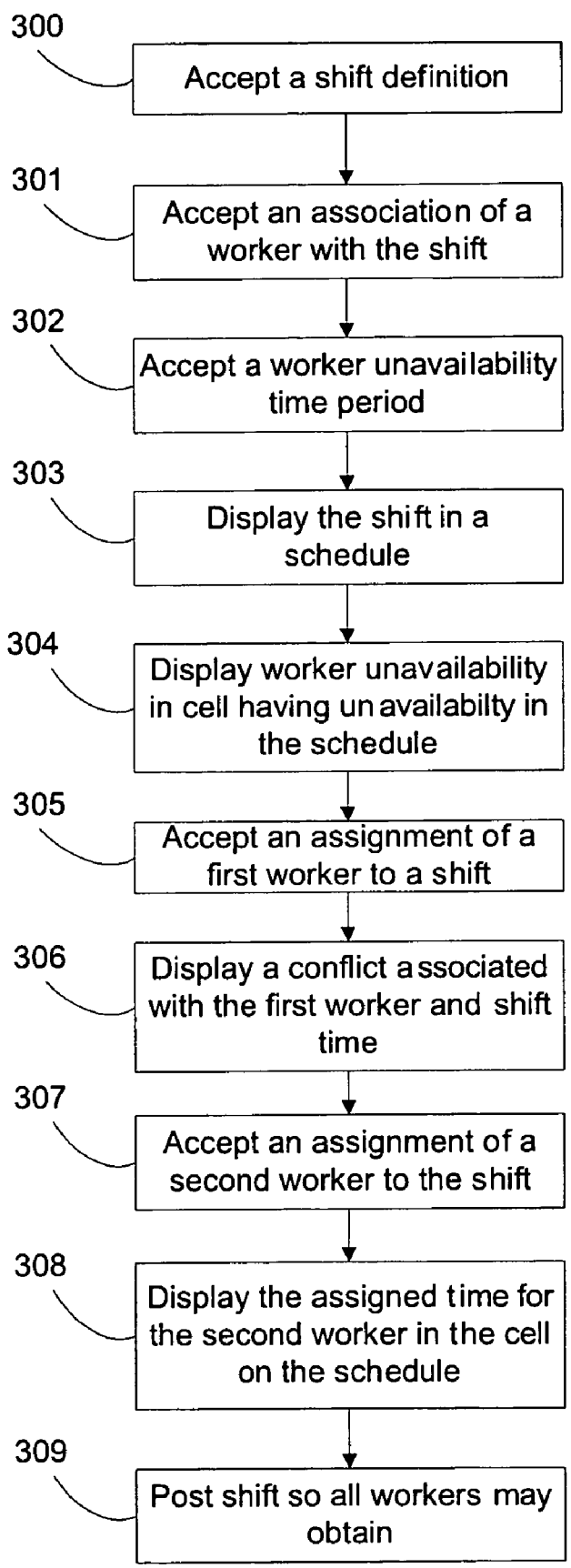
FIG. 3 shows a method for scheduling employee shifts utilizing an embodiment of the invention.

FIG. 3 shows a method for scheduling employee shifts utilizing an embodiment of the invention. The system first begins by accepting a shift definition that defines a shift at 300. The system then proceeds by accepting an association of at least one worker with the shift at 301. Any number of workers may be assigned a time span that defines a shift by selecting the cells associated with workers directly on the schedule and then entering the start and end time associated with the shift for example. As is common, when a worker defines their hours of availability upon entry to the system, the system proceeds by accepting the worker unavailability at 302. The system displays the shift in a schedule showing the workers and time as a two dimensional grid having workers displayed in one axis and time displayed in another axis at 303. The unavailability of each worker per time period is shown as an unavailability drawing within each cell having unavailability associated with a given user and time period at 304. The system accepts assignments of workers to a shift at 305 as provided to the system by a manager. When conflicts between the assigned shift and the availability of the worker arise a conflict warning is displayed without hiding the schedule from view at 306. One method for showing conflicts is to show a cell having a conflict in a particular color or as a request to change the schedule. At this point, the system accepts an assignment of another worker that does not have a conflict to the shift at 307. The assigned time is displayed in each cell associated with workers that do not have conflicts at 308. This includes the worker that has been assigned time that was possibly not originally intended to work the shift, but for which availability exists. The schedule is posted at 309 so that workers may obtain the schedule, either through a network connection such as a web based Internet connection, or via text messaging via a cell phone or email or any other method of remote transmission.

While the invention herein disclosed has been described by means of specific embodiments and applications thereof, numerous modifications and variations could be made thereto by those skilled in the art without departing from the scope of the invention set forth in the claims.

What is claimed is:

1. A method for scheduling employee shifts comprising:
   accepting a shift definition that defines a shift as entered from a manager;
   posting said shift so that said at least one worker may obtain said shift;
   sending a text message to said at least one worker wherein said text message comprises a schedule containing said shift in shorthand format;
   accepting an association of at least one worker with said shift as entered from said manager;
   accepting a worker unavailability time period as entered from a first worker who is not said manager;
   displaying said shift in a schedule having a worker axis along which workers are displayed and having a time axis along which time intervals are displayed;
   displaying said worker unavailability time period in a cell in said schedule wherein said cell is associated with said first worker and a time frame along said time axis wherein said worker unavailability time period is displayed as a dark band in said horizontal bar and wherein worker availability is displayed as a light area in said horizontal bar wherein said horizontal bar is utilized by said manager to avoid conflicts before scheduling workers;
   assigning said first worker to said shift by said manager wherein said first worker is selected from said at least one worker;
   displaying a conflict warning associated with said worker unavailability time period and said shift while concurrently displaying said schedule;
   accepting an assignment of a second worker to said shift wherein said second worker is selected from said at least one worker and wherein said second worker does not have an unavailability time period conflict with said shift;
   sending to said manager a first request for time off by a third worker;
   executing a find replacement function by the manager and displaying cells in said schedule that are currently associated with said workers that are currently not working an associated shift with said first request for time off;
   determining that at least one of said workers associated with said available cells is available to work said associated shift with said request for time off;
   submitting a second request for a shift change by said first worker;
   displaying to said first worker at least one replacement worker who is available to accept said shift change, wherein said at least one replacement worker is displayed in said schedule;
   displaying a contact screen to said first worker wherein said first worker obtains contact information of said at least one replacement worker, wherein said contact information enables said first worker to contact said at least one replacement worker and find a candidate replacement worker without involving said manager;
   accepting a third request from said candidate replacement worker for said shift change with said first worker;
   presenting to said manager but not to said first worker or said candidate a list of requests comprising at least said first request, said second request, and said third request, wherein said requests are color coded based on how far into the future each of said requests are to occur;
   presenting wages summary per worker, a wages summary per shift, and a cost value associated with each request in said list of requests to said manager but not to said first or said second worker, wherein said manager determines a minimum and maximum cost of replacing a worker based on a minimum pay rate and a maximum pay rate of other workers who are not scheduled to work said shift; and,
   presenting in said schedule to said manager percentages of schedule workers divided by sales;
   accepting or denying each of said requests based on the manager minimizing wages or costs associated with said shift by utilizing said minimum and maximum cost of replacing said worker, said cost value associated with the request, said wages summary per worker, said wages summary per shift, and said percentages.

2. The method of claim 1 further comprising:
   emailing said at least one worker said schedule.

3. The method of claim 1 further comprising:
   displaying said shift in a first color when said shift has not yet been posted.

4. The method of claim 1 further comprising:
   un-posting said shift so that said at least one worker may no longer obtain said shift;
   altering said shift; and,
   posting said shift a second time.

5. A system for scheduling employee shifts comprising:
   a computer;
   a software component executing on said computer configured to:
     accept a shift definition that defines a shift as entered from a manager;
     post said shift so that said at least one worker may obtain said shift;
     send a text message to said at least one worker wherein said text message comprises a schedule containing said shift in shorthand format;
     accept an association of said at least one worker with said shift as entered by said manager;
     accept a worker unavailability time period as entered by a first worker who is not said manager;
     display said shift in said schedule having a worker axis along which workers are displayed and having a time axis along which time intervals are displayed;
     display said worker unavailability time period as a horizontal bar in a cell in said schedule wherein said cell is associated with said first worker and a time frame along said time axis wherein said worker unavailability time period is displayed as a dark band in said horizontal bar and wherein worker availability is displayed as a light area in said horizontal bar wherein said horizontal bar is utilized by said manager to avoid conflicts before scheduling workers;
     assign said first worker to said shift by said manager wherein said first worker is selected from said at least one worker;
     display a conflict warning associated with said worker unavailability time period and said shift when said schedule is concurrently displayed;

accept an assignment of a second worker to said shift wherein said second worker is selected from said at least one worker and wherein said second worker does not have an unavailability time period conflict with said shift;

send to said manager a first request for time off by a third worker; execute a find replacement function by the manager and display cells in said schedule that are currently associated with said workers that are currently not working an associated shift with said first request for time off;

determine that at least one of said workers associated with said available cells is available to work said associated shift with said request for time off;

submit a second request for a shift change by said first worker;

display to said first worker at least one replacement worker who is available to accept said shift change, wherein said at least one replacement worker is displayed in said schedule;

display a contact screen to said first worker wherein said first worker obtains contact information of said at least one replacement worker, wherein said contact information enables said first worker to contact said at least one replacement worker and find a candidate replacement worker without involving said manager;

accept a third request from said candidate replacement worker for said shift change with said first worker;

present to said manager but not to said first worker or said candidate a list of requests comprising at least said first request, said second request, and said third request, wherein said requests are color coded based on how far into the future each of said requests are to occur;

present wages summary per worker, a wages summary per shift, and a cost value associated with each request in said list of requests to said manager but not to said first or said second worker, wherein said manager determines a minimum and maximum cost of replacing a worker based on a minimum pay rate and a maximum pay rate of other workers who are not scheduled to work said shift; and, present in said schedule to said manager percentages of schedule workers divided by sales;

accept or deny each of said requests based on the manager minimizing wages or costs associated with said shift by utilizing said minimum and maximum cost of replacing said worker, said cost value associated with the request, said wages summary per worker, said wages summary per shift, and said percentages.

6. The system of claim 5 wherein said software component is further configured to:
   email said at least one worker said schedule.

7. The system of claim 5 wherein said software component is further configured to:
   display said shift in a first color when said shift has not yet been posted.

8. The system of claim 5 wherein said software component is further configured to:
   un-post said shift so that said at least one worker may no longer obtain said shift;
   alter said shift; and,
   post said shift a second time.

* * * * *